US012275163B2

(12) United States Patent
Wörz

(10) Patent No.: US 12,275,163 B2
(45) Date of Patent: Apr. 15, 2025

(54) MOLD, IN PARTICULAR CONCRETE MOLD

(71) Applicant: Rampf Formen GmbH, Allmeindingen (DE)

(72) Inventor: Andreas Wörz, Blaustein (DE)

(73) Assignee: Rampf Formen GmbH, Allmeindingen (DE)

( * ) Notice: Subject to any disclaimer, the term of this patent is extended or adjusted under 35 U.S.C. 154(b) by 1016 days.

(21) Appl. No.: 16/927,483

(22) Filed: Jul. 13, 2020

(65) Prior Publication Data

US 2020/0361118 A1 Nov. 19, 2020

Related U.S. Application Data

(63) Continuation of application No. PCT/EP2019/050852, filed on Jan. 15, 2019.

(30) Foreign Application Priority Data

Jan. 19, 2018 (DE) ..................... 10 2018 101 165.2

(51) Int. Cl.
*B28B 7/00* (2006.01)
*B28B 7/24* (2006.01)

(52) U.S. Cl.
CPC .............. *B28B 7/0014* (2013.01); *B28B 7/24* (2013.01)

(58) Field of Classification Search
CPC ....... B28B 7/0014; B28B 7/0029; B28B 7/24; B29C 33/306
See application file for complete search history.

(56) References Cited

U.S. PATENT DOCUMENTS 5,297,772 A * 3/1994 Stefanick ................ B28B 7/366 249/102
6,007,321 A 12/1999 Meckel et al.

FOREIGN PATENT DOCUMENTS

DE 29 34 838 A1 3/1981
DE 42 37 788 A1 5/1994
DE 103 14 863 A1 11/2003
DE 102006026115 A1 * 12/2007 ............. B28B 1/081
EP 0 719 622 A1 7/1996
(Continued)

OTHER PUBLICATIONS

German Search Report (Application No. 10 2018 101 165.2) dated Oct. 10, 2018.

(Continued)

*Primary Examiner* — John J DeRusso
*Assistant Examiner* — Victoria Bartlett
(74) *Attorney, Agent, or Firm* — BURR PATENT LAW, PLLC

(57) ABSTRACT

A concrete mold including a mold frame with a frame body and at least two rows of teeth formed on the frame body lying opposite one another and in each case facing a mold insert. The mold insert has an insert body and at least two rows of teeth arranged on the insert body lying opposite one another and in each case facing the mold frame. Recesses are in each case formed on the insert body between teeth of its rows of teeth, in which recesses teeth of the rows of teeth of the frame body in each case engage in the assembled state of the mold. Recesses are in each case formed on the frame body between the teeth of its rows of teeth, in which recesses the teeth of the rows of teeth of the insert body in each case engage in the assembled state of the mold.

9 Claims, 4 Drawing Sheets

(56) References Cited

FOREIGN PATENT DOCUMENTS

| | | | | |
|---|---|---|---|---|
| GB | 2 282 775 | A | | 4/1995 |
| JP | H0550436 | A | * | 3/1993 |
| KR | 101135359 | B1 | * | 4/2012 |

OTHER PUBLICATIONS

English Translation of the International Preliminary Report on Patentability (Chapter I)(Application No. PCT/EP2019/050852) dated Jul. 21, 2020.

International Search Report and Written Opinion (Application No. PCT/EP2019/050852) dated Aug. 26, 2019.

* cited by examiner

MOLD, IN PARTICULAR CONCRETE MOLD

CROSS REFERENCE TO RELATED APPLICATIONS

This application is a continuation of International Application No. PCT/EP2019/050852 filed Jan. 15, 2019, which designated the United States, and claims the benefit under 35 USC § 119(a)-(d) of German Application No. 10 2018 101 165.2 filed Jan. 19, 2018, the entireties of which are incorporated herein by reference.

FIELD OF THE INVENTION

The present invention relates to a mold, and in particular, a concrete mold.

BACKGROUND OF THE INVENTION

DE 42 37 788 A1 discloses a mold for producing molded bodies from concrete in a molding machine, wherein the mold comprises a mold frame and a mold insert, wherein at least one mold cavity is formed in the mold insert, and wherein the mold insert is received into a receiving space of the mold frame.

SUMMARY OF THE INVENTION

Since at the present time molded bodies made of concrete are increasingly manufactured with shorter cycle times and molded bodies which are made from concrete and have a low height are increasingly the trend, it is the object of the present invention to propose a mold in which a connection between the mold frame and the mold insert has a high degree of stability and load-bearing capacity, and the mold frame and the mold insert can in particular have a low overall height.

In the case of the mold according to the present invention, the mold frame comprises a frame body and at least two rows of teeth, wherein two of the rows of teeth are formed on the frame body opposite one another and in each case facing the mold insert, wherein the mold insert comprises an insert body and at least two rows of teeth, wherein two of the rows of teeth are arranged on the insert body opposite one another and in each case facing the mold frame, wherein recesses are each formed on the insert body of the mold insert between teeth of its rows of teeth, in which recesses teeth of the rows of teeth of the frame body in each case engage in the assembled state of the mold, and wherein recesses are in each case formed on the frame body of the mold frame between the teeth of its rows of teeth, in which recesses the teeth of the rows of teeth of the insert body in each case engage in the assembled state of the mold. Such an arrangement of the rows of teeth means that the teeth do not load one another, and therefore the mold can basically withstand higher loadings. Furthermore, it is possible for the teeth of the opposite rows of teeth to be arranged next to one another and for the overall height of mold frame and mold insert to thereby be able to be kept low.

Furthermore, it is provided that either the teeth of at least one of the rows of teeth of the mold insert and, in particular, all of the rows of teeth of the mold insert are releasably connected to the insert body in such a manner, and/or that the teeth of at least one of the rows of teeth of the mold frame and, in particular, all of the rows of teeth of the mold frame are releasably connected to the frame body, in such a manner that the mold insert which is held nondisplaceably in the mold frame can be taken out of the receiving space of the mold insert after removal of the teeth. The mold insert can thereby be mounted in a simple manner in the mold frame and removed in a simple manner from the mold frame, and therefore maintenance work can easily be carried out both to the mold frame and to the mold insert, or an exchange can be rapidly undertaken in the event of damage to the mold insert or the mold frame.

It is also provided that the teeth of adjacent rows of teeth are arranged offset with respect to one another, and that the recesses assigned to the adjacent rows of teeth are arranged offset with respect to one another. By this means, it is possible to arrange the teeth and the recesses of all of the rows of teeth on a common level and to avoid an arrangement of teeth lying above one another, and thus to achieve a lower overall height.

It is also provided to equip each removable tooth with a securing means with which the tooth is fixed on the frame body or on the insert body, wherein the securing means is designed, in particular, in such a manner that it either comprises a threaded pin, which is integrally formed on the tooth, and a nut or that it comprises a screw which can be inserted through a through bore or that it comprises a screw, which can be inserted through a through bore, and a nut. Securings of this type make it possible for the teeth to be rapidly and reliably mounted and removed.

Furthermore, it is provided that the frame body of the mold frame has a supporting surface formed from at least one surface, that the insert body of the mold insert has a supporting surface formed from at least one surface, and that at least one of the removable teeth has a lower contact surface, wherein the supporting surfaces of the frame body and of the insert body lie on a common plane, and wherein either the contact surface of the tooth likewise lies on the common plane or the contact surface of the tooth lies spaced apart from the common plane, and therefore a cavity is formed between the common plane and the contact surface of the tooth. By this means, in the first variant, extensive support of the teeth on a production base is possible, by means of which, in particular, a vibration loading of the teeth can be kept low. By this means, in the second variant, tolerance of the mold in relation to soiling forming on the teeth in the region of the securing means is ensured.

It is also provided that at least one of the removable teeth has an upper contact surface, wherein the recess formed on the frame body for the removable tooth comprises a mating contact surface, wherein a tooth receptacle formed on the insert body for the removable tooth comprises a mating contact surface and wherein either the mating contact surface of the insert body and the mating contact surface of the frame body form a step-free bearing plane for the upper contact surface for the removable tooth and the upper contact surface of the removable tooth is divided into a frame-body contact surface and into an insert-body contact surface and these have such a difference in levels that the frame body and the insert body are braced together when the tooth is fitted, or the upper contact surface of the removable tooth is designed as a flat contact surface and the mating contact surface of the insert body and the mating contact surface of the frame body have such a difference in levels that the frame body and the insert body are placed together when the tooth is fitted. Such a design makes it possible to brace the mold insert and the mold frame together and thus to prevent an undesirable release, in particular of screw connections.

Furthermore, it is provided that the mold comprises cutting mechanisms, wherein the cutting mechanisms are arranged between the removable tooth and the frame body and/or the insert body and are formed, in particular, integrally with the removable tooth and/or the frame body and/or the insert body. By this means, an undesirable displacement of the teeth or of the insert body in relation to the frame body is more effectively avoided by an additional form fit in the production mode.

It is also provided that the mold insert or the mold frame comprises threaded bores or through bores for receiving the securing mechanism. In such a design, the use of cost-effective standard components is possible.

Finally, it is provided that the recesses which are formed on the insert body of the mold insert between teeth of its rows of teeth and the recesses which are formed on the frame body of the mold frame between the teeth of its rows of teeth are open to a lower side of the mold. By this means, an extremely simple assembly is possible in which the rows of teeth connected fixedly or nonreleasably to the mold insert or to the mold frame can be pushed in a single-dimensional movement into the associated recesses and in which the rows of teeth or teeth connected releasably to the mold insert or to the mold frame can subsequently likewise be inserted in in each case single-dimensional movements into the respectively associated recesses and then fixed.

BRIEF DESCRIPTION OF THE DRAWINGS

Further details of the present invention will be described in the drawing with reference to schematically illustrated exemplary embodiments.

DETAILED DESCRIPTION OF THE INVENTION

Figure 1:
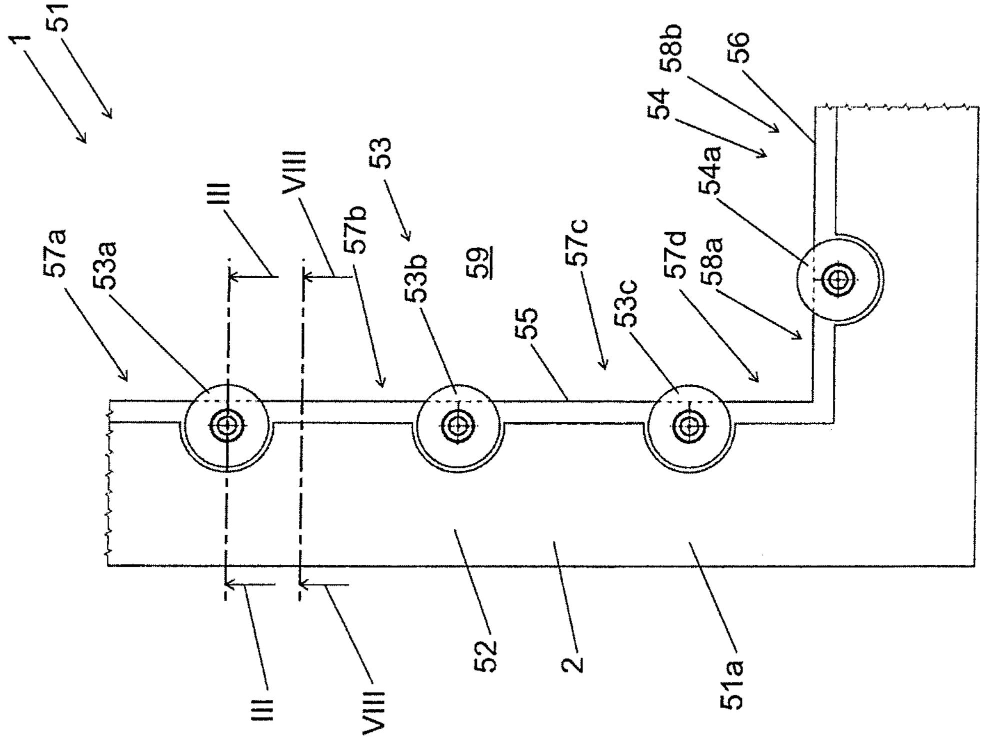
FIG. 1 shows a partial view from below of a mold frame in a first variant embodiment of a mold.

FIG. 1 shows a partial view from below of a mold frame 51 of a first variant embodiment of a mold 1.

Figure 2:
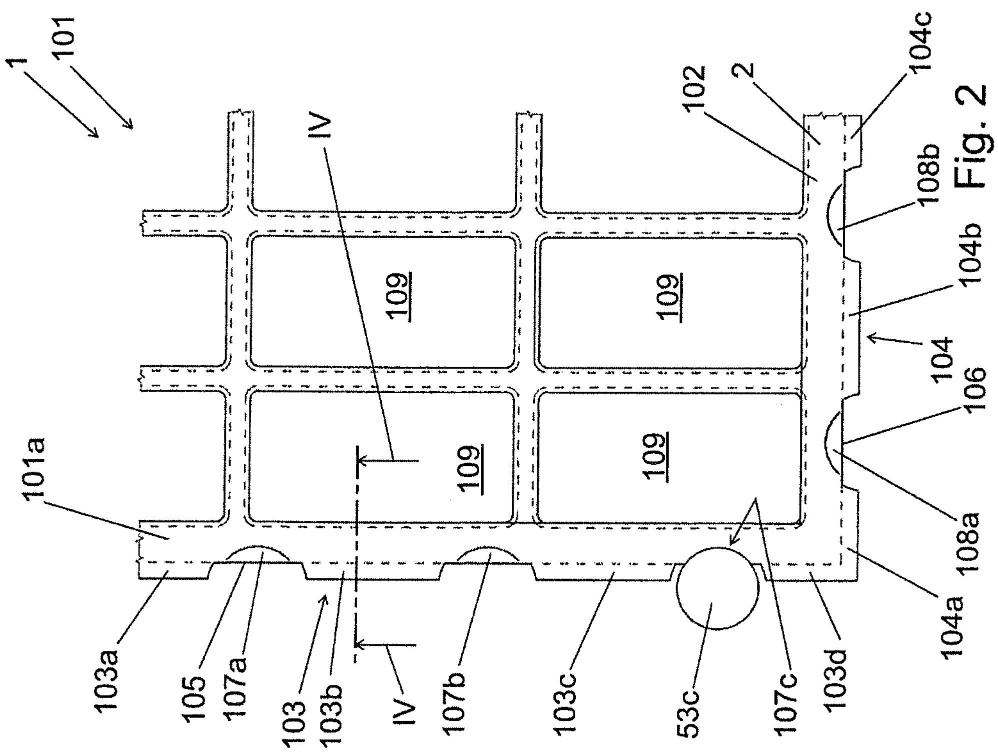
FIG. 2 shows a partial view from below of a mold insert of the mold, of which the mold frame is shown in FIG. 1.

FIG. 2 shows a partial view from below of a mold insert 101 and of an insert body 101*a* of the mold insert 101 of the mold 1, of which the mold frame 51 can be seen in FIG. 1.

In FIG. 1, the observer is looking at a lower side 52 of the mold frame 51 and, in FIG. 2, the observer is looking at a lower side 102 of the mold insert 101. Both lower sides 52, 102 form a lower side 2 of the mold 1.

Figure 3:
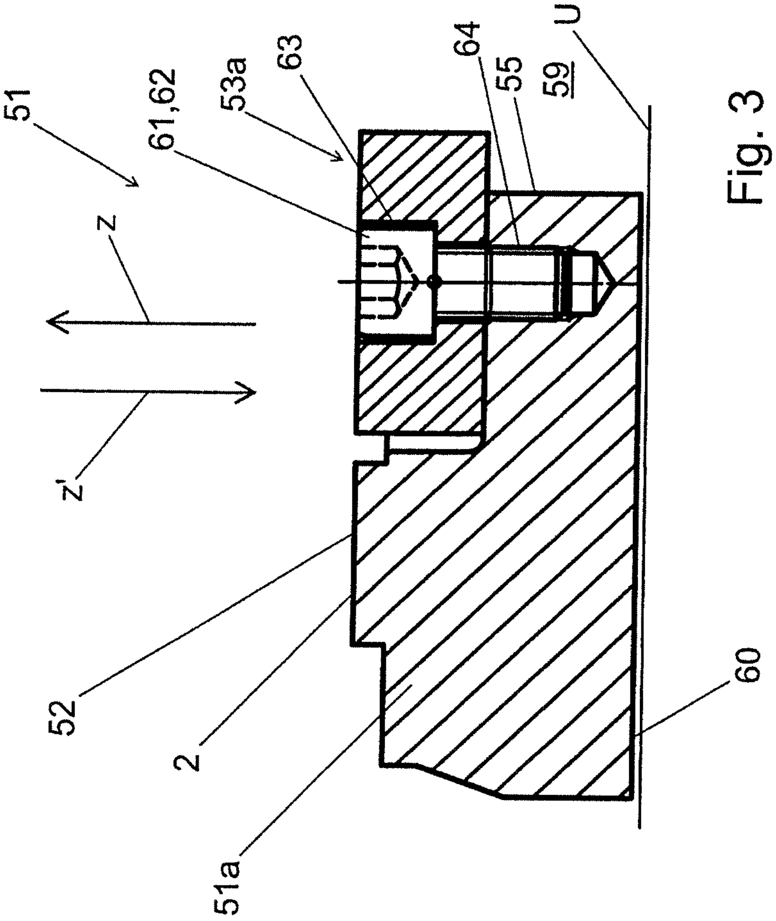
FIG. 3 shows a section through the mold frame shown in FIG. 1, along the section line

FIG. 3 shows a section through the mold frame 51 shown in FIG. 1, corresponding to the section line III-III. In the section, the lower side 52 of the mold frame 51 faces upward corresponding to the position which the mold frame 51 takes up in FIG. 1. The mold frame 51 comprises a frame body 51*a* and teeth 53*a* to 53*c* and 54*a* which are fitted on the latter, wherein the teeth 53*a* to 53*c* arranged on a longitudinal side 55 of the mold frame 51 or of the frame body 51*a* form a first row of teeth 53, and wherein the tooth 54*a* arranged on a transverse side 56 of the mold frame 51 is part of a second row of teeth 54. A further row of teeth is arranged on a second longitudinal side (not illustrated) lying opposite the first longitudinal side 55. Furthermore, a further row of teeth is arranged on a second transverse side (not illustrated) lying opposite the first transverse side 56. Recesses 57*a* to 57*d* and 58*a*, 58*b* are formed between the teeth 53*a* to 53*c* and 54*a*.

Figure 4:
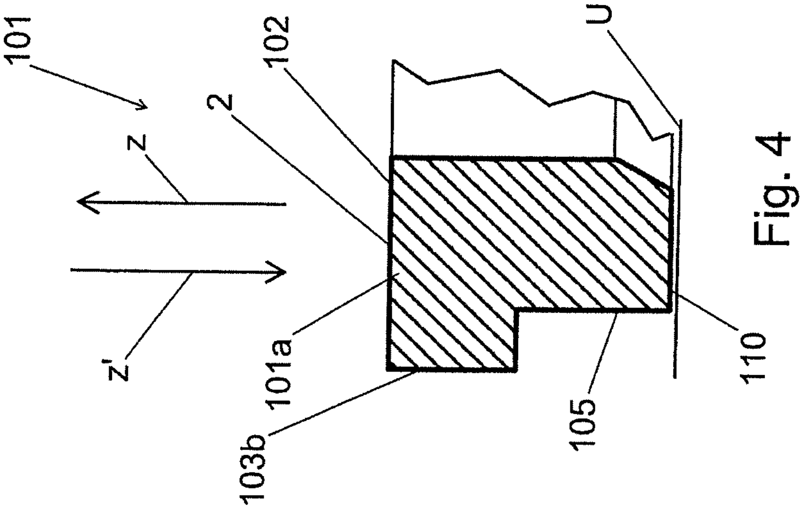
FIG. 4 shows a section through the mold frame shown in FIG. 2, along the section line IV-IV.

FIG. 4 shows a section through the mold insert 101 shown in FIG. 2, corresponding to a section line IV-IV. In the section, the lower side 102 of the mold insert 101 faces upward corresponding to the position which the mold insert 101 takes up in FIG. 2. Teeth 103*a* to 103*d* and 104*a* to 104*c* are formed on the mold insert 101, wherein the teeth 103*a* to 103*d* arranged on a longitudinal side 105 of the mold insert 101 form a first row of teeth 103, and wherein the teeth 104*a* to 104*c* arranged on a transverse side 106 of the mold insert 101 are part of a second row of teeth 104. A further row of teeth is arranged on a second longitudinal side (not illustrated) lying opposite the first longitudinal side 105. Furthermore, a further row of teeth is arranged on a second transverse side (not illustrated) lying opposite the first transverse side 106. Recesses 107*a* to 107*c* and 108*a*, 108*b* are formed between the teeth 103*a* to 103*d* and 104*a* to 104*c*, respectively. The mold insert 101 furthermore only partially shows mold cavities 109, denoted by reference signs, in which molded blocks made of concrete can be produced when the mold 1 is assembled and rests with its mold lower side 2 on a production base. In order to produce the molded blocks, the mold cavities 109 are then filled with liquid concrete. The latter is shaped and compressed by punches entering the mold cavities 109 and by vibrations introduced via the production bases. The mold is subsequently lifted off the production base, and therefore the molded blocks remain on the production base and can be removed.

An overall view of FIGS. 1 and 2 and of FIGS. 3 and 4 reveals that, in the assembled state of mold frame 51 and mold insert 101, the teeth 53*a* to 53*c*, 54*a* of the rows of teeth 53, 54 of the mold frame 51 engage in the recesses 107*a* to 107*c*, 108*a*, 108*b* of the mold insert 101, and the teeth 103*a* to 103*d*, 104*a* to 104*c* of the rows of teeth 103, 104 of the mold insert 101 engage in the recesses 57*a* to 57*d*, 58*a*, 58*b* of the mold frame 51. The mold insert 101 is thereby held in the mold frame 51 in such a manner that the mold insert 101 can neither be moved relative to the mold frame 51 out of the plane of the drawing nor into the plane of the drawing—when looking at FIGS. 1 and 2. Of course, installation of the mold insert 101 shown in FIG. 2 into a receiving space 59 of the mold frame 51 shown in FIG. 1 is possible only when the teeth 53*a* to 53*c* and 54*a* are removed from the mold frame 51. For mounting from above in the arrow direction z', with respect to FIGS. 3 and 4, the mold insert 101 is placed into the receiving space 59 of the mold frame 51, the lower side 52 of which faces upward. The mold frame 51 lies with an upper side 60 on a base U. After insertion, the mold insert 101 likewise lies again with an upper side 110 on the base U. Following the insertion, the teeth 53*a* to 53*c*, 54*a* of the mold frame 51 are then screwed to the mold frame 51 by securing means 61 which are in the form of screws 62. For this purpose, each tooth 53*a* to 53*c*, 54*a* of the mold frame 51 has a step-shaped through bore 63 and, for this purpose, the mold frame 51 in the region of each tooth 53*a* to 53*c*, 54*a* has a threaded bore 64 into which the screw 62 is screwed in the fully fitted state. In the fully fitted state, the teeth 103*a* to 103*d*, 104*a* to 104*c* of the mold insert 101 then prevent—with respect to FIGS. 3 and 4—the mold frame 51 from being able to be lifted upward from the mold insert 101 in the arrow direction z. In the fully fitted state, the teeth 53*a* to 53*c*, 54*a* of the mold frame 51 then prevent—with respect to FIGS. 3 and 4—the mold insert 101 from being able to be lifted upward from the mold frame 51 in the arrow direction z. By this means, the mold insert 101 is then rigidly connected to the mold frame 51. The recesses 57*a* to 57*d*, 58*a*, 58*b* of the mold frame 51 and the recesses 107*a* to 107*c*, 108*a*, 108*b* of the mold insert 101 are open to the lower side 2 of the mold. For explanatory purposes, the tooth 53*c* is shown in FIG. 2, and therefore it can be seen how the tooth 53 engages in the recess 107*c* and rests on the mold insert 101.

The interaction of the mold frame 51 with the mold insert 101 is explained once again with reference to FIGS. 5 to 9. Here, the mold frame 51 and the mold insert 101 are oriented in such a manner that they rest with their lower sides 52 and 102, respectively, on the base U.

FIGS. 5 to 9 show diverse further sections through the mold frame 51 or through the mold frame 51 and the mold insert 101, wherein, in these illustrations, the mold frame 51 or the mold frame 51 and the mold insert 101 are shown in a position which is turned through 180° in relation to the sectional illustrations of FIGS. 3 and 4 and in which the mold frame 51 rests with its lower side 52 on the base U or in which the mold frame 51 and the mold insert 101 rest with their lower sides 52 and 102, respectively, on the base U.

FIG. 5 once again shows a section, with respect to FIG. 1, corresponding to the section line through the mold frame 51 shown in FIG. 1, with the tooth 53*a* not being illustrated in FIG. 5.

Figure 5:
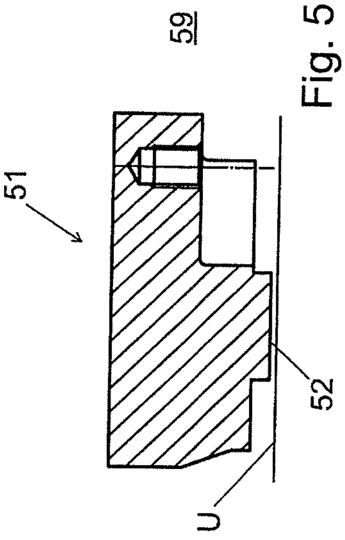
FIG. 5 shows a section through the mold frame of the mold of the first variant embodiment in the region of a releasably fastened tooth with the tooth removed.
Figure 6:
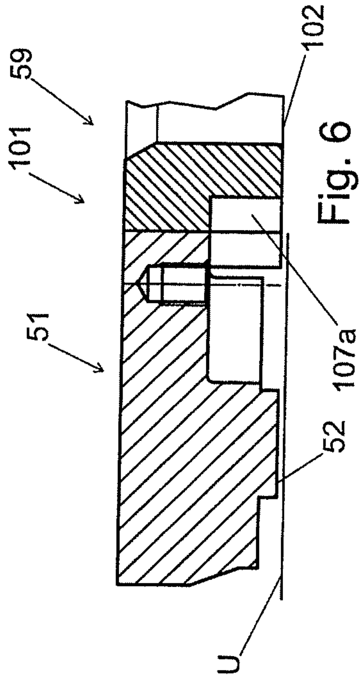
FIG. 6 shows a section through the mold frame and the mold insert of the mold of the first variant embodiment in the region of a releasably fastened tooth with the tooth removed.

Analogously to the section illustrated in FIG. 5, FIG. 6 shows a section through the mold 1 with the mold insert 101 inserted into the receiving space 59 of the mold frame 51, wherein the tooth 53*a* (see FIG. 1) is not yet fitted on the mold frame 51. The recess 107*a* which opens to the lower side 102 of the mold insert 101 and in which the tooth, not illustrated, can engage can be seen on the mold insert 101.

Figure 7:
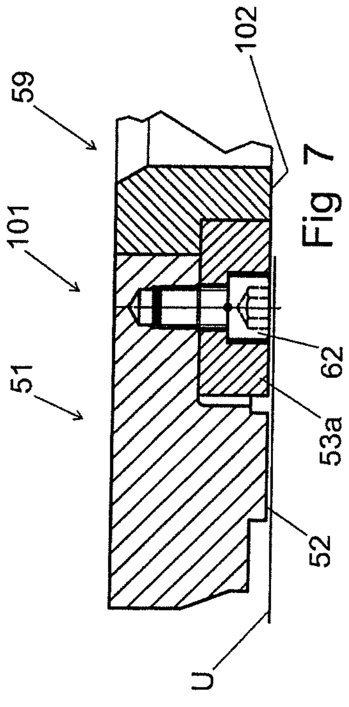
FIG. 7 shows a section through the mold frame and the mold insert of the mold of the first variant embodiment in the region of a releasably fastened tooth with the tooth fitted.

FIG. 7 then shows the illustration of FIG. 6, wherein the tooth 53*a* is now fastened to the mold frame 51 by means of the screw 62 and engages in the recess 107*a* (see FIG. 6).

Figure 8:
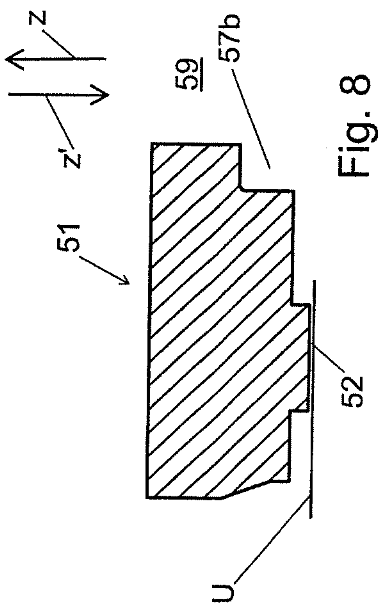
FIG. 8 shows a section through the mold frame of the mold of the first variant embodiment in the region of a recess.

FIG. 8 shows a further section, with respect to FIG. 5, through the mold frame 51 corresponding to the section line VIII-VIII which is illustrated in FIG. 1 and which runs in the region of the recess 57*b* of the mold frame 51. The recess 57*b* opens not only toward the mold insert 101 (see FIG. 9), but also toward the base U on the lower side 52 of the mold frame 51, and therefore the mold insert 101 can be pushed from below in the arrow direction z into the receiving space 59 of the mold frame 51, or the mold frame 51 can be placed from above in arrow direction z' on the mold insert 101, before the teeth 53*a* to 53*c*, 54*a* are then screwed to the mold frame 51.

Figure 9:
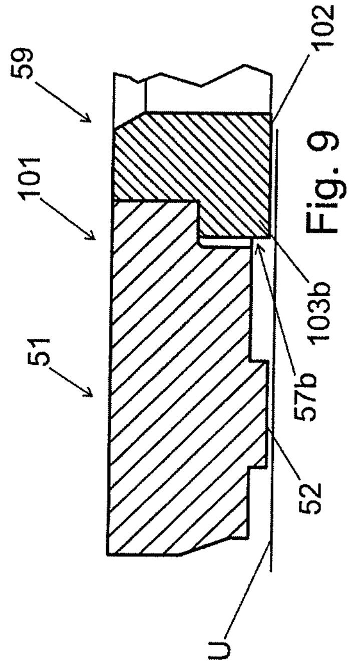
FIG. 9 shows a section through the mold frame and the mold insert of the mold of the first variant embodiment in the region of a recess of the mold frame and of a tooth of the mold insert.

Analogously to FIGS. 6 and 7, FIG. 9 shows the mold 1 in the region of the section illustrated in FIG. 8, wherein the mold insert 101 is now received in the receiving space 59 of the mold frame 1. It can be seen in this illustration how the tooth 103*b* of the mold insert 101 engages in the recess 57*b*.

Figure 10:
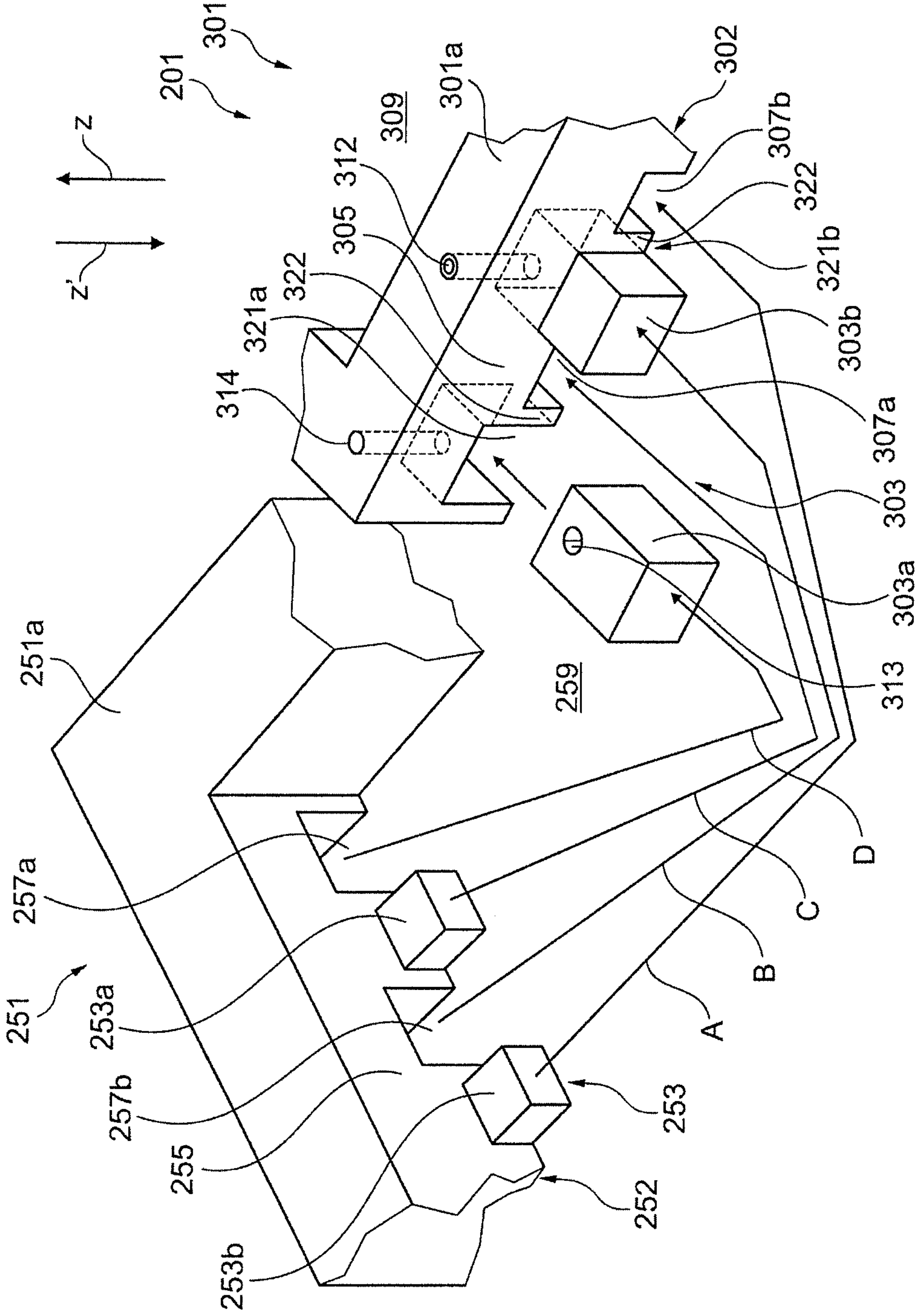
FIG. 10 shows a perspective illustration of parts of a second variant embodiment of a mold in an exploded illustration.

FIG. 10 finally shows a second variant embodiment of a mold 201. The mold 201 is illustrated in an exploded view, wherein the mold 201 comprises a mold frame 251 and a mold insert 301, and wherein the mold frame 251 is shown rotated in relation to the mold insert 301 such that a longitudinal side 255 of the mold frame 251 and a longitudinal side 305 of the mold insert 301 are readily visible. A mold cavity 309 of the mold insert 301 can likewise be seen. As indicated by the arrows A, B, C and D, the longitudinal side 255 and the longitudinal side 305 lie opposite each other in the assembled state of the mold 201, in which the mold insert 301 is placed into a receiving space 259 of the mold frame 251.

The mold frame 251 comprises teeth 253*a* and 253*b* and also recesses 257*a* and 257*b* on its longitudinal side 255. The teeth 253*a*, 253*b* are connected nonreleasably to a frame body 251*a* of the mold frame 251. The recesses 257*a* and 257*b* are formed on the frame body 251*a* and open to the longitudinal side 255 and to a lower side 252 of the mold frame 251. Since the frame body 251*a* annularly encircles the receiving space and a further longitudinal side (not illustrated) of the mold frame 251 lying opposite the longitudinal side 255 of the mold frame 251 is formed comparably to the longitudinal side 255, the arrows A to D do not symbolize pushing together, but merely indicate the manner in which the mold frame 251 and the mold insert 301 interact in the fully assembled state of the mold 201. The mounting or the assembly of the mold 201 is explained in more detail further below. A further longitudinal side (not illustrated) of the mold insert 301 that lies opposite the longitudinal side 305 of the cuboidal mold insert 301 is formed comparably to the longitudinal side 305 and interacts correspondingly with the longitudinal side (not illustrated) of the mold frame 201. Optionally, as shown in the first variant embodiment, rows of teeth and recesses can be provided on one or on both transverse sides of the mold frame and of the mold insert, and therefore the mold insert is held not only on two opposite sides, but on a total of three sides or four sides in a form-fitting manner in the mold frame.

For the mounting, teeth 303*a*, 303*b* which can be screwed to an insert body 301*a* of the mold insert 301 are removed therefrom and the insert body 301*a* is placed from above in arrow direction z' into the receiving space 259 of the mold frame 251, wherein the longitudinal side 305 of the mold insert 301 is oriented here parallel to the longitudinal side 255 of the mold frame 251. During the insertion, the teeth 253*a*, 253*b* are then received by recesses 307*a*, 307*b* which are open to the longitudinal side 305 and to a lower side 302 of the mold insert 301. Subsequently, the teeth 303*a*, 303*b* of the mold insert 301 are inserted from below into the recesses 257*a*, 257*b* of the mold frame 251 and into tooth receptacles 321*a*, 321*b* of the mold insert 301, the tooth receptacles corresponding to the recesses and being formed in the insert body 301*a*. In the fully fitted state, the teeth 303*a*, 303*b* are screwed to the insert body 301*a* with screws 312 which are each inserted from below in arrow direction z into a through bore 313 of the teeth 303*a*, 303*b* and are screwed into threaded bores 314 which are formed in the insert body 301*a*. Accordingly, in the fully mounted state of the mold 201, a row of teeth 253 of the mold frame 251 and a row of teeth 303 of the mold insert 301 then lie offset opposite one another.

According to a variant embodiment of the present invention, it is also provided that the tooth receptacles 321*a*, 321*b* and the recesses 307*a*, 307*b* merge directly into one another and the separating webs 322 shown in FIG. 10 are omitted. In such an embodiment, it can also be provided that the teeth of the mold insert and the teeth of the mold frame are dimensioned in such a manner that they lie laterally against one another in the fully mounted state of the mold.

LIST OF REFERENCE SIGNS

1 Mold
2 Lower side of the mold
51 Mold frame
51*a* Frame body
52 Lower side
53 Row of teeth
53*a*-53*c* Tooth
54 Row of teeth
54*a* Tooth
55 Longitudinal side
56 Transverse side
57*a*-57*d* Recess
58*a*, 58*b* Recess
59 Receiving space
60 Upper side
61 Securing mechanism
62 Screw
63 Through bore
64 Threaded bore
101 Mold insert
101*a* Insert body
102 Lower side
103 Row of teeth
103*a*-103*d* Tooth
104 Row of teeth
104*a*-104*c* Tooth
105 Longitudinal side
106 Transverse side
107*a*-107*c* Recess
108*a*, 108*b* Recess
109 Mold cavity
110 Upper side
201 Mold
251 Mold frame
251*a* Frame body
253 Row of teeth
253*a*, 253*b* Tooth
255 Longitudinal side
257*a*, 257*b* Recess
259 Receiving space
301 Mold insert
301*a* Insert body
303 Row of teeth
305 Longitudinal side
309 Mold cavity
303*a*, 303*b* Tooth
307*a*, 307*b* Recess
312 Screw
313 Through bore
314 Threaded bore
321*a*, 321*b* Tooth receptacle
z, z' Arrow direction
A-D Arrow

The invention claimed is:

1. A concrete mold for producing molded bodies from concrete in a molding machine comprising:

a single mold frame; and a single mold insert, wherein at least one mold cavity is formed in the mold insert, wherein the mold insert is received into a receiving space of the mold frame, wherein the mold frame comprises a frame body and at least two rows of mold frame body teeth, wherein two of the rows of the mold frame body teeth are formed on the mold frame body opposite one another and in each case facing the mold insert, wherein the mold insert comprises a mold insert body and at least two rows of mold insert body teeth, wherein two of the rows of the mold insert body teeth are arranged on the mold insert body opposite one another and in each case facing the mold frame, wherein mold insert recesses are each formed between the mold insert body teeth, wherein the mold frame body teeth in each case interlockingly engage in the mold insert recesses to provide a first interlocking arrangement in an assembled state of the mold, and wherein mold frame recesses are in each case formed between the mold frame body teeth, wherein the mold insert body teeth in each case interlockingly engage in the mold frame recesses to provide a second interlocking arrangement in the assembled state of the mold, whereby the mold insert is held nondisplaceably in the mold frame in the assembled state of the mold only by the first and second interlocking arrangements.

2. The mold as claimed in claim 1, wherein the mold insert body teeth of at least one of the rows of the mold insert body teeth, and/or the mold frame body teeth of at least one of the rows of the mold frame body teeth are each individually removable from a respective one of the mold insert body or the mold frame body such that, the mold insert, which is held nondisplaceably in the mold frame, can be removed from the receiving space of the mold frame after removal of one or more of the individually removable mold frame body teeth or one or more of the individually removable mold insert body teeth.

3. The mold as claimed in claim 2, wherein each of the individually removable mold frame body teeth and/or the individually removable mold insert body teeth comprise a securing mechanism that fixes the respective individually removable teeth on the mold frame body or on the mold insert body, and wherein the securing mechanism comprises at least one of (a) a threaded pin integrally formed on a respective one of the mold frame body teeth and/or the mold insert body teeth and a nut, (b) a screw inserted through a through bore, and (c) a screw inserted through a through bore and a nut.

4. The mold as claimed in claim 3, wherein the mold insert or the mold frame comprises threaded bores or through bores for receiving the securing mechanism.

5. The mold as claimed in claim 2, wherein the mold frame body of the mold frame has a supporting surface, wherein the mold insert body has a supporting surface formed, wherein at least one of the individually removable teeth has a lower contact surface, wherein the supporting surfaces of the mold frame body and the mold insert body lie on a common plane, and wherein either the lower contact surface of the at least one of the individually removable teeth also lies on the common plane, or the lower contact surface of the at least one of the individually removable teeth is spaced apart from the common plane, thereby defining a cavity between the common plane and the contact surface of the at least one of the individually removable teeth.

6. The mold as claimed in claim 2, wherein at least one of the individually removable teeth has an upper contact surface, wherein the mold frame body recesses comprise a mating contact surface, wherein a tooth receptacle formed on the mold insert body for receiving the at least one of the individually removable teeth comprises a mating contact surface, and wherein the mating contact surface of the mold insert body and the mating contact surface of the mold frame body form a step-free bearing plane for the upper contact surface of the at least one of the individually removable teeth, and wherein the upper contact surface of the at least one of the individually removable teeth is divided into a frame-body contact surface and an insert-body contact surface, such that a difference in a level of the mold frame body and a level of the mold insert body are braced together when the at least one of the individually removable teeth is fitted, or the upper contact surface of the at least one of the individually removable teeth has a flat contact surface, and the mating contact surface of the mold insert body and the mating contact surface of the mold frame body are arranged at different levels so that the mold frame body and the mold insert body are placed together when the at least one of the individually removable teeth is fitted.

7. The mold as claimed in claim 2, wherein all of the rows of mold insert body teeth are individually releasably connected to the mold insert body and/or wherein all of the rows of mold frame body teeth are individually releasably connected to the mold frame body.

8. The mold as claimed in claim 1, wherein the mold insert body teeth and the mold frame body teeth are arranged in adjacent rows and are offset with respect to one another, and wherein the mold frame recesses and the mold insert recesses assigned to the adjacent rows of mold frame body teeth and mold insert body teeth are offset with respect to one another.

9. The mold as claimed in claim 1, wherein the mold insert recesses formed between the mold insert body teeth, and the mold frame recesses formed between the mold frame body teeth, are open to a lower side of the mold.

* * * * *